(12) United States Patent
Ouerghemmi et al.

(10) Patent No.: US 11,613,495 B2
(45) Date of Patent: Mar. 28, 2023

(54) METHOD FOR CONTROLLING A FIBRE DRAWING FACILITY

(71) Applicant: SAINT-GOBAIN ISOVER, Courbevoie (FR)

(72) Inventors: Ezzeddine Ouerghemmi, Antony (FR); Hans Michael Lieberknecht, Margny les Compiegne (FR); Jean-Dominique Depuille, Agnetz (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 52 days.

(21) Appl. No.: 16/980,583

(22) PCT Filed: Mar. 13, 2019

(86) PCT No.: PCT/FR2019/050545
§ 371 (c)(1),
(2) Date: Sep. 14, 2020

(87) PCT Pub. No.: WO2019/175503
PCT Pub. Date: Sep. 19, 2019

(65) Prior Publication Data
US 2021/0053864 A1    Feb. 25, 2021

(30) Foreign Application Priority Data

Mar. 14, 2018  (FR) ...................... 1852204

(51) Int. Cl.
*C03B 5/225*  (2006.01)
*C03B 5/235*  (2006.01)
(Continued)

(52) U.S. Cl.
CPC .............. *C03B 37/07* (2013.01); *C03B 37/04* (2013.01)

(58) Field of Classification Search
CPC ........ C03B 37/04; C03B 37/07; C03B 37/048
(Continued)

(56) References Cited

U.S. PATENT DOCUMENTS

| 4,392,879 A | * | 7/1983 | Takeuchi | .............. | C03B 37/048 65/460 |
| 4,718,930 A | * | 1/1988 | Gartner | ................ | C03B 37/048 65/459 |

(Continued)

FOREIGN PATENT DOCUMENTS

| DE | 35 36 137 C1 | 12/1986 | |
| EP | 0 479 675 A2 | 4/1992 | |
| WO | WO-2017017383 A2 * | 2/2017 | ............. C03B 37/04 |

OTHER PUBLICATIONS

International Search Report as issued in International Patent Application No. PCT/FR2019/050545, dated Jun. 27, 2019.

*Primary Examiner* — Alison L Hindenlang
*Assistant Examiner* — Steven S Lee
(74) *Attorney, Agent, or Firm* — Pillsbury Winthrop Shaw Pittman LLP

(57) ABSTRACT

The present invention concerns a method of determination of specific points of a rotary fibre forming spinner wheel (10) used in a fibre forming device (1), said method comprising the following steps:
obtaining measurements of temperatures of the fibre forming spinner wheel obtained by means of a temperature measuring device (40) adapted to take measurements of temperatures of the spinner wheel at a plurality of angular positions of said measuring device in order to supply data to at least one calculation unit (30, 45) that constructs a curve representing the temperature as a function of the angular position of a temperature measuring device;

(Continued)

processing said measurements by effecting a calculation of the second derivative of the curve of the temperature as a function of the angular position by means of a calculation unit (30);

searching for at least one specific point for which the second derivative satisfies a predefined condition.

10 Claims, 3 Drawing Sheets

(51) Int. Cl.
*C03B 33/02* (2006.01)
*B23K 26/364* (2014.01)
*B23K 26/40* (2014.01)
*C03B 33/10* (2006.01)
*B23K 26/0622* (2014.01)
*C03B 33/07* (2006.01)
*B23K 26/18* (2006.01)
*B23K 26/53* (2014.01)
*B23K 26/359* (2014.01)
*B23K 26/352* (2014.01)
*B23K 103/00* (2006.01)
*C03B 37/07* (2006.01)
*C03B 37/04* (2006.01)

(58) Field of Classification Search
USPC .......................................................... 65/521
See application file for complete search history.

(56) References Cited

U.S. PATENT DOCUMENTS

| | | | |
|---|---|---|---|
| 5,259,857 A * | 11/1993 | Pasquier | C03B 37/048 425/8 |
| 6,158,249 A * | 12/2000 | Battigelli | C03C 3/091 65/522 |
| 9,771,294 B1 * | 9/2017 | Zubko | C03B 37/06 |
| 2003/0196458 A1 * | 10/2003 | Bennett | C03B 37/04 241/23 |
| 2005/0098670 A1 * | 5/2005 | Lasalle | C03B 37/048 241/261.2 |
| 2015/0191389 A1 * | 7/2015 | Chakroun | C03B 37/04 65/522 |
| 2016/0357174 A1 * | 12/2016 | Buchak | C03B 37/0253 |

* cited by examiner

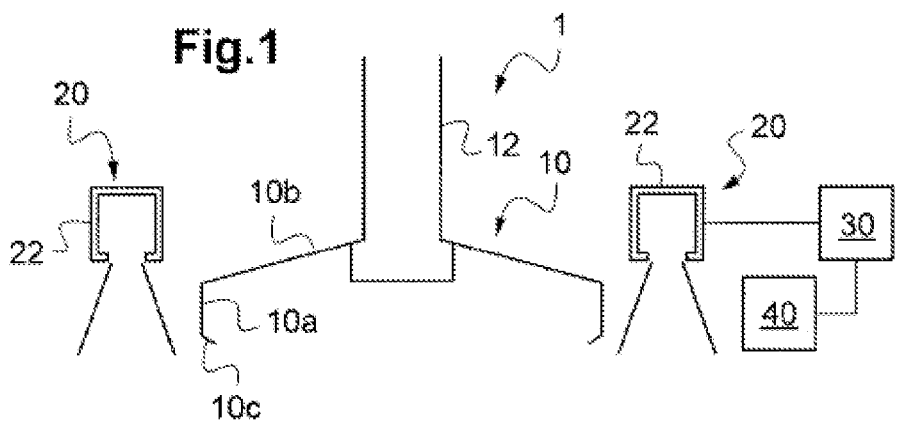
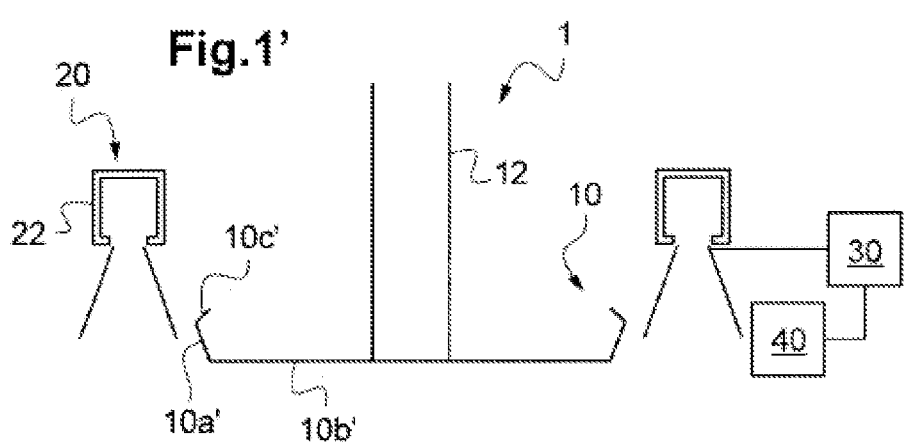
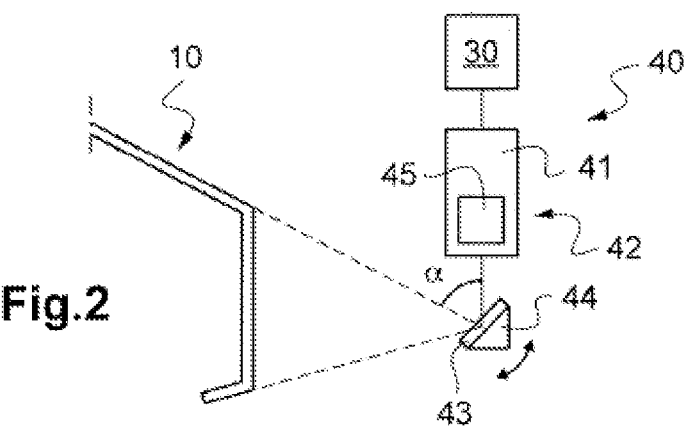

METHOD FOR CONTROLLING A FIBRE DRAWING FACILITY

The present invention relates to the field of fibre forming devices.

PRIOR ART

So-called insulation glass fibres are routinely produced by internal centrifuging, that is to say by introducing a stream of molten glass into a centrifuge also known as a fibre forming spinner wheel rotating at high speed and having at its periphery a very large number of orifices. By the action of the centrifugal force the glass is projected through these orifices in the form of filaments. To the centrifugal force there may be added stretching by a gas flow at high temperature and high speed emitted tangentially to the perforating wall of the peripheral strip of the centrifuge. In these techniques the centrifuge is very highly loaded by stresses of mechanical origin (high rotation speed), thermal origin (glass at around 1000° C.) and chemical origin (corrosion by the molten glass).

These stresses exerted on the centrifuge lead to deterioration thereof, that is to say where that is materialised for example by a variation of the dimensions of its orifices.

Now, the quality of the fibres produced depends very closely on the correct operation of the centrifuge, that is to say on its good general state and compliance with speed and temperature setpoints.

At present, it is known to limit the wear of the centrifuge by acting on the temperature. In fact, for improved longevity, the temperature at the top and bottom of the strip and the profile along the strip may be controlled.

A control method known from the document EP0479675 consists in measuring the temperature of the fibre forming spinner wheel at different points in order thereafter to regulate it by modifying the rotation speed of the spinner wheel and/or by modifying the temperature of the molten glass.

These specific points are located by measuring the temperature of the spinner wheel via a temperature sensor.

This sensor is a pyrometer at least a part of which is pivotably mounted and sweeps an angle intersecting the vertical axis of symmetry of the fibre forming device so as to cover by a continuous to-and-fro movement the full height of the peripheral strip. The vertical coordinate of each measured point is determined in each sweep of the peripheral strip and the temperature profile is stored in vertical coordinates over the height of the strip. This profile includes three remarkable points A, B and C respectively corresponding to the highest point of the strip, the hottest point and the bottom point or strip bottom. It is to be noted that the point A does not correspond in all cases to an extremum of the curve but its vertical coordinate may be found relative to the position of the point C, the distance between A and C corresponding exactly to the height of the peripheral strip. The points B and C are identified by analysis of the curve derived from the curve corresponding to the temperature profile using vertical coordinates. The known control method determines the temperatures and coordinates of the remarkable points of the strip (top and bottom points and hottest point) by analysis of the curve derived from the curve corresponding to the temperature profile over the height of the peripheral strip.

Now, the use of these vertical coordinates has the disadvantage of leading to inaccuracy of regulation over time. In fact, the fibre forming spinner wheel is subjected to wear over time with the result that the vertical coordinate of each point varies over time. Thus regulation is effected on the basis of points that are no longer the required remarkable points.

Also, the fibre forming spinner wheel may vibrate when it is operating. As in the case of wear, these vibrations imply that the points used for regulation are not the required remarkable points.

SUMMARY OF THE INVENTION

The present invention therefore proposes to remove these drawbacks by providing a fibre forming method enabling more effective regulation and improved longevity.

To this end the invention concerns a method of determination of specific points of a rotary fibre forming spinner wheel used in a fibre forming device, said method comprising the following steps:

obtaining measurements of temperatures of the fibre forming spinner wheel obtained by means of a temperature measuring device adapted to take measurements of temperatures of the spinner wheel at a plurality of angular positions in the direction of the rotation axis of the spinner wheel in order to supply data to at least one calculation unit that constructs a curve representing the temperature as a function of the angular position of a temperature measuring device;

processing said measurements by effecting a calculation of the second derivative of the curve of the temperature as a function of the angular position by means of a calculation unit;

searching for at least one specific point for which the second derivative satisfies a predefined condition.

The method of determining specific points of a fibre forming spinner wheel advantageously makes it possible to supply reliable points. In fact, the method according to the invention of determination of specific points of a fibre forming spinner wheel makes it possible to ignore the wear and/or the vibrations to which the fibre forming spinner wheel is subjected. To this end, the determination method according to the invention is based on the analysis of the variation of the slope of the curve (temperature, position) and uses the second derivative of a curve representing the temperature as a function of the angular position of a temperature measuring device and not vertical coordinates changing with said vibrations or wear.

According to one example, the predefined conditions consists in having the value of the second derivative equal to zero.

According to one example, this determination method comprises an additional searching step consisting in searching for the specific point characterized by the fact that the temperature there is at its maximum.

According to one example, the measurements of temperatures are taken during a regular interval and then averaged before the processing step.

According to one example, said measurement taking interval is between 2 and 5 seconds inclusive, preferably 3 seconds.

The invention further concerns a method of controlling the fabrication of mineral fibre by a fibre forming method using a fibre forming device to fabricate mineral fibres, the fibre forming device comprising a fibre forming spinner wheel pierced to enable centrifugal generation of fibres and an annular burner generating an annular gas flow to stretch the fibres, said method comprising the following steps:

effecting measurements of temperatures of the fibre forming spinner wheel by means of a temperature measuring device at different annular positions of the temperature measuring device;

determining at least one specific point using any of the embodiments of the determination method;

comparing the measured temperature to a predetermined value for this at least one first specific point;

generating at least one first control signal for regulating the temperature of the fibre forming device at said specific point by means of a first regulation member.

According to one example, a second specific point is determined and regulated.

According to one example, the fibre forming device comprises a first means for variation of the temperature of the first specific point.

According to one example, the fibre forming device comprises a second means for variation of the temperature of the second specific point.

According to one example, said fibre forming spinner wheel comprises an annular wall pierced by a plurality of orifices and extended laterally by an upper part and a lower part and in which at least one specific point is determined from the point of the round-off that is found at the junction between the perforated part of the peripheral strip and an upper part extending the peripheral strip laterally, the hot spot corresponding to the point at which the temperature is the highest and the bottom point.

According to one example, the temperature is regulated at two at least of the specific points that have been determined: a first specific point being the bottom point and a second specific point being the round-off point.

The invention further concerns a computer program including instructions for the execution of some or all of the steps of a method for determination of specific points or some or all of the steps of a method for regulation of a fibre forming spinner plate when said program is executed by a computer.

The invention further concerns a computer-readable storage medium on which is stored a computer program comprising instructions for the execution of some or all of the steps of a method for determination of specific points or some or all of the steps of a method for regulation of a fibre forming spinner plate when said program is executed by a computer.

DESCRIPTION OF THE FIGURES

Other particular features and advantages will emerge clearly from the following description thereof given by way of nonlimiting illustration and with reference to the appended drawings, in which:

FIG. 1 is a diagrammatic representation of a fibre forming system according to the invention;

FIG. 1' is a diagrammatic representation of a variant centrifuge of the fibre forming system;

FIG. 2 is a diagrammatic representation of a sensor module according to the invention;

DETAILED DESCRIPTION OF THE INVENTION

Figure 3:
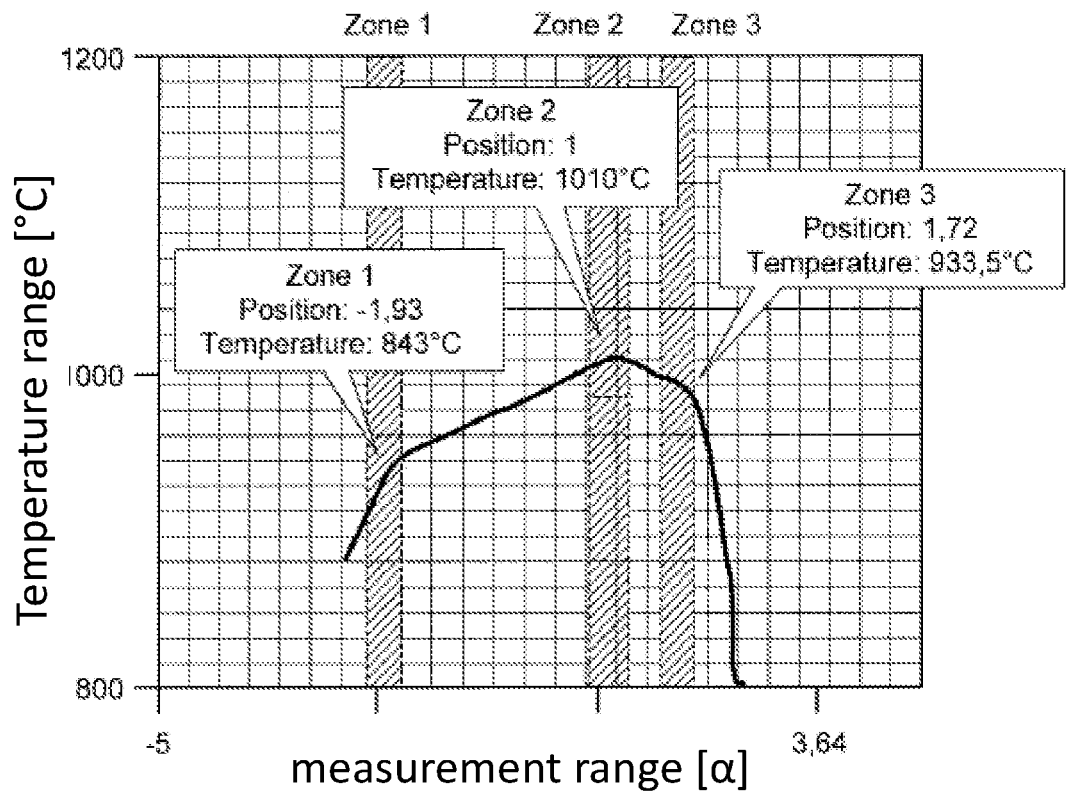
FIG. 3 is a diagrammatic representation of a diagram of temperature as a function of the position of the fibre forming spinner wheel.

In FIG. 1 is shown a fibre forming system 1. A fibre forming system of this kind comprises a centrifuge 10 also known as a fibre forming spinner wheel fixed to a shaft 12, rotating at high speed and having at its periphery a very large number of orifices. Because of the action of the centrifugal force, the glass is projected through these orifices in the form of filaments. Of course, the centrifuge could be of any type: with a bottom as can be seen in FIG. 1' or with no bottom as can be seen in FIG. 1.

The fibre forming spinner wheel 10 is a device for forming mineral fibres of micrometric diameter by internal centrifuging. A fibre forming spinner wheel 10 comprises an annular wall 10a pierced with a plurality of orifices and extended laterally by an upper part and a lower part. In a first configuration, in FIG. 1, the upper part is a web 10b connecting the spinner wheel to the drive shaft and the lower part is an interior lip 10c bent in the direction of the drive shaft. In a second configuration known as a spinner wheel with a bottom, shown in FIG. 1', the upper part is an interior lip 10c' bent in the direction of the drive shaft and the lower part is a web 10b' forming the bottom of the spinner wheel 10'.

This fibre forming spinner wheel is heated by a heating module 20. The heating module 20 comprises at least one burner 22 enabling stretching of the fibre. This internal combustion burner includes a combustion chamber fed with fuel and with oxidizer, the chamber including an envelope having a closed first end and an opposite exhaust open end through which the combustion gases escape, the envelope having at least two opposite walls that connect the two ends. The burner includes in the chamber and at the level of the closed first end at least one combustion device fed with fuel and oxidizer.

By means of the burner, the filaments projected by the effect of the centrifugal force are then subjected to the action of a stretching annular gas flow at high temperature and high speed along the wall of the centrifuge that thins them and transforms them into fibres.

This heating module 20 is controlled by a calculation unit 30. A calculation unit 30 of this kind consists for example of a computer provided with an interface enabling the operator to adjust the fibre forming system. The calculation unit 30 is therefore connected to the heating module 20 in order to send it commands.

The fibre forming system 1 further comprises a sensor module 40, as shown in FIG. 2. A sensor module 40 of this kind comprises a temperature sensor 41 and is connected to the calculation unit 30.

The temperature sensor used is a pyrometric type sensor. A pyrometric sensor of this kind uses infrared radiation. In fact, a thermometer/pyrometer IR measures temperature by quantification of the infrared radiant energy emitted on the basis that any object above absolute zero (0 K) emits this radiation. Knowing the quantity of energy emitted by an object and its emissivity, its temperature can therefore be determined. Broadly speaking, the principle consists in measuring the infrared luminous energy by means of a detector converting it into an electrical signal. A lens enables the radiation IR to be focused onto the detector. This method advantageously enables remote measurement of the temperature.

The temperature sensor IR is associated with a mirror system that can be seen in FIG. 2. A mirror system of this kind enables infrared radiation to be directed toward the detector from any point. The mirror system 42 comprises a mirror 43 pivotably mounted on a support 44. This pivotable mounting of the mirror 43 enables it to direct the radiation IR from different points of the fibre forming spinner wheel as can be seen in FIG. 2 mainly in a vertical plane of the spinner wheel extending in a direction parallel to the rotational axis of the spinner wheel and in a direction orthogonal to the latter. However, the temperature sensor may be used on its own and itself be pivotably mounted.

This capability of the assembly comprising the pyrometer and the mirror to measure the temperature at different points enables a temperature plot of the fibre forming spinner wheel to be obtained. This temperature plot is used by the calculation unit 30 to adjust the temperature.

To obtain this plot, a first step of the method according to the invention of controlling the fabrication of mineral fibre consists in using the pyrometer (measurement range 500-2000° C.) and the oscillating mirror. The mirror 43 is caused to oscillate at a certain frequency to sweep the fibre forming spinner wheel 10 and to obtain measurements of the temperature as a function of the angular position a of the mirror. These measurements can be processed by a calculation unit 45 internal to said sensor module 40 to provide directly a curve of the temperature as a function of the angular position of the mirror or sent to the calculation unit 30 to which the sensor module 40 is connected to be processed and to obtain a curve of the temperature as a function of the angular position a of the mirror.

The curve in FIG. 3 representative of a spinner wheel according to FIG. 1 is obtained in this way.

These temperature measurements are effected continuously. It is possible to smooth the curve of the temperature as a function of the angular position both to smooth the curve and to eliminate noise. To this end, the measurements effected in a predefined regular interval are averaged, and this interval will be between 2 and 5 seconds inclusive, preferably 3 seconds. It is therefore clear that the measurements are stored in a memory over a time period and then averaged.

In a second step of the control method this curve is processed by the calculation unit 30 in order to extract at least one specific point by the method according to the invention for determination of specific points.

The determination method comprises a first step consisting in obtaining measurements of temperatures of the fibre forming spinner wheel obtained by means of a temperature measuring device 40.

A second step of the determination method consists in processing the data by means of the calculation unit 30 to calculate and obtain the second derivative of the curve of the temperature as a function of the angular position of the mirror 43. This second derivative is used to search for characteristic/specific points. In fact, the second derivative enables the variation of the slope to be obtained.

In a third step of the determination method the second derivative of the curve of the temperature as a function of the angular position of the mirror 43 is analysed by the calculation unit 30 to search for specific points. These specific points are the points for which the second derivative satisfies a predefined condition. In one example, this condition is that the value of the second derivative is equal to zero. This condition is characteristic of the top and bottom points on a fibre forming spinner wheel and corresponds to extreme points of the curve.

It is thereafter possible to define to what the specific/characteristic point corresponds. It will be clear that the points representative of the bottom of the strip of the spinner wheel and the round-off of the spinner wheel are on respective opposite sides of said hot spot, at the local extrema of the curve.

Figure 4:
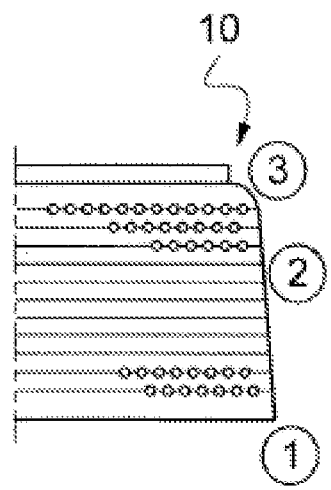
FIG. 4 is a diagrammatic representation of the specific points on a fibre forming spinner wheel.

In the case of the present invention, two specific/characteristic points (which correspond to zones 1 and 3 in FIG. 4) are searched for. A first specific point corresponds to the spinner wheel strip bottom temperature (zone 1) and a second specific point corresponds to the spinner wheel round-off (zone 3) as can be seen in FIG. 4.

Also, an optional fourth step of the determination method may be carried out. This optional fourth step consists in finding the hot spot of the fibre forming spinner wheel. To this end the calculation unit 30 searches for the absolute maximum of the curve that corresponds to said hot spot. This hot spot is the central specific/characteristic point (zone 2), between the points corresponding to temperature of the spinner wheel strip bottom (zone 1) and the spinner wheel round-off (zone 3).

This use of the second derivative advantageously makes it possible to ignore the fluctuations of the dimensions of the spinner wheel. In fact, the spinner wheel dimensions may vary with wear and/or vibrations. Now, despite this variation of the dimensions of the spinner wheel, its general shape remains exactly the same. Because of this, the specific/characteristic points are durable. This makes it possible always to be in a position to identify the specific points correctly. The resulting regulation is therefore always effected at precise specific points that are truly representative of the spinner wheel. It is clear that this second derivative calculation and the use of a curve of the temperature as a function on the angular position of the mirror are dependent. In fact, the use of a curve of the temperature as a function of the angular position of the mirror enables a temperature profile to be obtained that is subtracted from the variations of the dimensions of the spinner wheel caused by its wear or its deformation because of thermal stresses when operating. Using the second derivative makes it always possible, on this temperature profile, to find the specific points searched for. This then enables use of automatic regulation, i.e. without an operator intervening to carry out supplemental calculations to obtain the required result.

In a subsequent phase on the control method, the temperature values of the particular points are used for regulation of the fibre forming spinner wheel 10.

In fact, the temperature of the three specific points of the fibre forming spinner wheel, that is to say the spinner wheel strip bottom point, the hot spot and the round-off point of the spinner wheel, must lie within a predefined interval. In the case of the example from FIG. 1, the predefined temperatures are, by way of illustration For the strip bottom (zone 1): 905-930° C.
For the round-off (zone 3): 960-990° C.
For the hot spot (zone 2): 960-980° C.

These predefined temperatures constitute threshold values used by comparing them to the measured temperatures.

Figure 5:
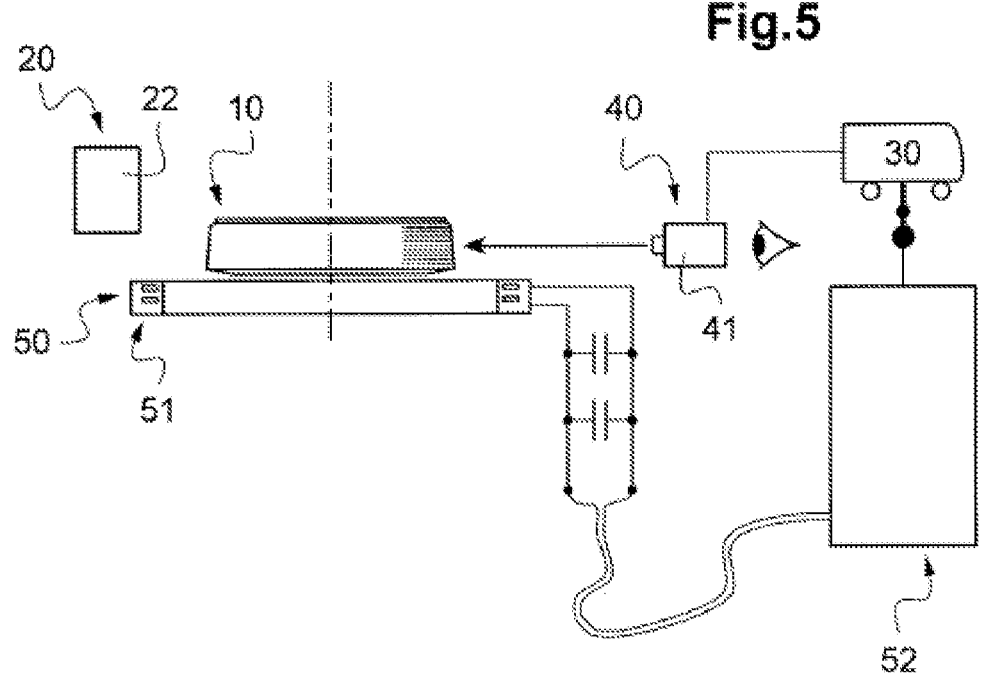
FIG. 5 is a diagrammatic representation of a fibre forming system according to the invention with a means for variation of the temperature of the spinner wheel.

In a first regulation loop, the first specific point or strip bottom point of the spinner wheel 10 is regulated. To this end, the first regulation loop acts on a first temperature variation means 50 as can be seen in FIG. 5. In this present case, the first temperature variation means 50 is a means enabling variation of the temperature of the fibre forming spinner wheel and comprises an induction coil 51 connected to a frequency generator 52 that can be seen in FIG. 5 that serves as a first temperature variation means. This frequency generator 52 generates a signal SI sent to the induction coil 51. It is this signal that makes it possible to modulate the induction power of the induction coil 52 and makes it possible to vary the heating temperature. Remember that the induction coil 51, when it has passed through it the signal SI which is a frequency-modulated electrical current, generates a magnetic field which, in turn, induces electrical currents in the nearby metal. The eddy current losses and hysteresis losses produced in this metal generate thermal energy (heat) by the Joule effect. This induction coil 51 is arranged in the bottom part of the fibre forming spinner wheel and more particularly under the fibre forming spinner wheel. This induction coil is adapted to face the stream of fibres created by said spinner wheel in order to be able to heat locally this bottom zone of the spinner wheel.

One example of a regulation loop consists in comparing the measured temperature at the spinner wheel strip bottom (zone 1) to a setpoint temperature, a first control signal being generated by the calculation unit. This control signal determines the power fed into the coil from the supply, this power being dependent on the current and the frequency. In the present instance, the required increment is 1° C.

Figure 6:
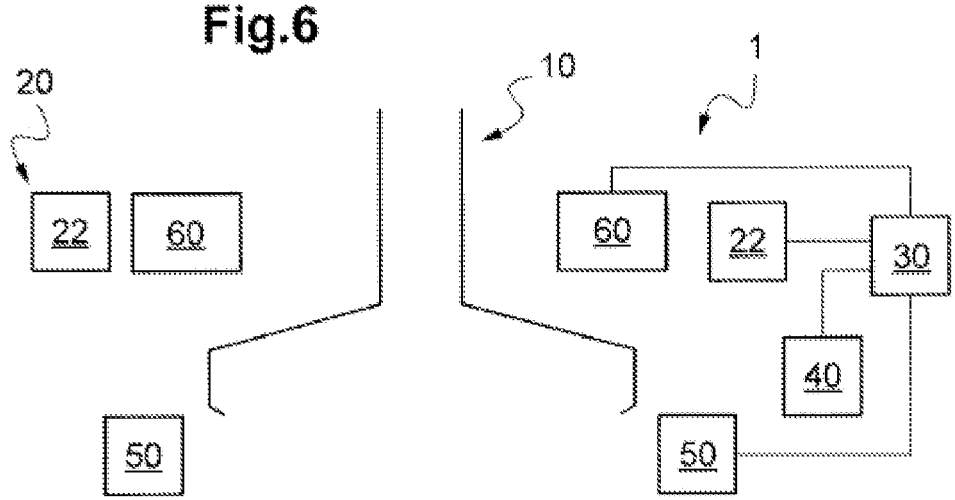
FIG. 6 is a diagrammatic representation of a fibre forming system according to the invention with two means for variation of the temperature of the spinner wheel.

In a second loop, for example, the temperature of the second specific point or round-off point is regulated. To this end, a second temperature variation means 60 is used as can be seen in FIG. 6. In one nonlimiting example this second temperature variation means 60 is an air circulation means comprising a suction part and a blower part. To be more specific, the air circulation means according to the invention is a means used to control the evacuation of smoke generated by the burner. Actually, it has been found that the flow rate of this smoke significantly influences the spinner wheel round-off temperature. Consequently the air circulation means according to the present invention is a means enabling decreased or increased evacuation of the smoke in order to modify the temperature of the round-off of a fibre forming spinner wheel.

This air circulation means comprises a flow variation means that may be one or two turbines or a pair of air injection nozzles. In both cases, the aim here is to generate a flow of air that will be added to the smoke evacuation flow, this additional flow being positive or negative, that is to say that, if it is positive, it makes it possible to increase this evacuation flow or, if it is negative, it makes it possible to slow it down. The blower part therefore enables generation of a negative additional flow while the suction part generates a positive additional flow.

This second loop compares the temperature measured at the round-off to a setpoint temperature, a second control signal being generated by the calculation unit 30. Apart from the fact that by acting on the temperature of the air that is injected or aspirated it is possible to adjust the temperature by acting on the flow rate of the air used for blowing or suction. To this end, one solution consists in the second signal generated by the calculation unit acting on the opening of valves. Each part of the air circulation device comprises a solenoid valve. This solenoid valve may be opened more or less depending on the current that is applied to it. Consequently it becomes possible to modify the air flow rate by modifying the opening of said valve. This therefore enables precise modification of the temperature.

Of course, two regulation loops that function in parallel or successively may be envisaged. Moreover, a fibre forming device according to the invention comprising only one of the two loops may be envisaged.

Having the two loops, that is to say being able to act on the bottom part and on the top part of the fibre forming spinner wheel 10, it is possible to decouple the temperature of the spinner wheel and its profile on the strip from the temperature of the combustion gases. It is therefore possible to maintain the quality of the fibres produced, because the external burner is not controlled.

The method of determination of specific points and the method of regulation each take the form of a computer program including instructions for the execution of some or all of the steps of said method when it is executed by a computer.

The programs of the method of determination of specific points and the method of regulation are stored on a computer-readable storage medium. This medium may be a CD or DVD or a flash memory or any other possible medium such as the cloud.

In order to have the smoothest possible regulation, the action on the various valves of the air circulation device is advantageously carried out in order for the valves not to be commanded simultaneously. In fact, regulation in which the opening of the valves for blowing air and for suction of air would be modified simultaneously would be unstable, with a temperature that would fluctuate and would have an impact on the quality of the fibres. On the other hand, regulation described as sequential will make possible a smaller fluctuation of the temperature. In concrete terms, regulation of this kind means that the valve in use is closed before the valve in the other circuit is opened. Regulation therefore comprises a plurality of sequences. In an example in which the air circulation device is in suction mode, i.e. in which the temperature is increased, the temperature is lowered by closing this suction valve. If the closure of this valve is sufficient then the valve of the blower circuit is not opened. On the other hand, if the temperature has not fallen sufficiently with the closure of the suction valve, then the blower valve is progressively opened. The step of modification of the smoke evacuation flow therefore comprises a sequence of injection of an additional flow added to said evacuation flow and/or a sequence of injection of an additional flow opposing said evacuation flow.

This makes it possible to have a lower regulation frequency generating a smoother regulation curve to optimise the quality of the fibres.

Of course, the present invention is not limited to the example shown and lends itself to diverse variants and modifications that will be apparent to the person skilled in the art.

The invention claimed is:

1. A method of of controlling fabrication of mineral fibres using a fibre forming device that includes a rotary fibre forming spinner wheel, a heating module and an air circulation system, said method comprising:

rotating the rotary fibre forming spinner wheel, said rotating rotary fibre forming spinner wheel being heated by the heating module;

measuring a temperature of the heated and rotating rotary fibre forming spinner wheel, with a temperature measuring device adapted to take measurements of temperatures of the rotary fibre forming spinner wheel, at each of a plurality of angular positions of said measuring device relative to the heated and rotating rotary fibre forming spinner wheel and supplying the measured temperature to at least one calculation unit that constructs a curve representing the temperature as a function of the angular position of a temperature measuring device;

processing, by said calculation unit, said measurements by effecting a calculation of the second derivative of the curve of the temperature as a function of the angular position by a calculation unit;

determining, by said calculation unit, at least one specific point of the heated and rotating rotary fibre forming spinner wheel for which the second derivative satisfies a predefined value;

and controlling said at least one of the heating module and the air circulation system to regulate a temperature of the heated and rotating rotary fibre forming spinner wheel at said at least one specific point, the temperature of the heated and rotating rotary fibre forming spinner wheel at said at least one specific point being regulated by the calculation unit by comparing the temperature of the heated and rotating rotary fibre forming spinner wheel at said at least one specific point to a setpoint signal, said calculation unit generating a control signal based on a result of the comparison, said control signal being used to control said at least one of the heating module and the air circulation system.

2. The method according to claim 1, wherein the predefined value is zero.

3. The method according to claim 1, comprising an additional searching step consisting in searching for the specific point characterized by the fact that the temperature there is at its maximum.

4. The method according to claim 1, wherein the measurements of temperatures are taken during a regular interval and then averaged before the processing.

5. The method according to claim 4, wherein said measurement taking interval is between 2 and 5 seconds inclusive.

6. The method according to claim 5, wherein said measurement taking interval is 3 seconds.

7. The method according to claim 1, wherein the fibre forming device comprises an induction coil to vary the temperature of the at least one specific point.

8. The method according to claim 1, wherein the air circulation system comprises a blower to vary the temperature of the at least one specific point.

9. The method according to claim 8, wherein the rotary fibre forming spinner wheel comprises an annular wall pierced by a series of orifices and extended laterally by an upper part and a lower part and wherein the at least one specific point is at a junction between a perforated part of the annular wall and the upper part extending the annular wall laterally.

10. A computer-readable storage medium on which is stored a computer program including instructions for the execution of some or all of the steps of a method according to claim 1 when said computer program is executed by a computer.

* * * * *